(12) United States Patent
Gros D'Aillon et al.

(10) Patent No.: US 7,705,318 B2
(45) Date of Patent: Apr. 27, 2010

(54) DEVICE AND METHOD FOR MEASURING THE ENERGY AND POSITION OF AN INCIDENT IONISING PARTICLE IN A DETECTOR

(75) Inventors: Eric Gros D'Aillon, Brie Et Angonnes (FR); Loïck Verger, Grenoble (FR)

(73) Assignee: Commissariat a l'Energie Atomique, Paris (FR)

( * ) Notice: Subject to any disclaimer, the term of this patent is extended or adjusted under 35 U.S.C. 154(b) by 61 days.

(21) Appl. No.: 11/631,945

(22) PCT Filed: Jul. 7, 2005

(86) PCT No.: PCT/FR2005/050553

§ 371 (c)(1),
(2), (4) Date: Jan. 9, 2007

(87) PCT Pub. No.: WO2006/008419

PCT Pub. Date: Jan. 26, 2006

(65) Prior Publication Data

US 2008/0073544 A1    Mar. 27, 2008

(30) Foreign Application Priority Data

Jul. 9, 2004    (FR)    ................................. 04 51491

(51) Int. Cl.
*G01T 1/24*    (2006.01)
(52) U.S. Cl. ................................................ 250/370.13

(58) Field of Classification Search ............... 250/371, 250/370.13, 370.1
See application file for complete search history.

(56) References Cited

U.S. PATENT DOCUMENTS

| 5,854,489 A | 12/1998 | Verger et al. |
| 6,329,651 B1 | 12/2001 | Mestais et al. |
| 2002/0036269 A1* | 3/2002 | Shahar et al. ............ 250/370.1 |

FOREIGN PATENT DOCUMENTS

| FR | 2 738 919 | 3/1997 |
| FR | 2 790 560 | 9/2000 |
| WO | WO 02/063339 A1 | 8/2002 |

OTHER PUBLICATIONS

H.H. Barrett, et al., "Charge Transport in Arrays of Semiconductor Gama-Ray Detectors", Physical Review Letters, vol. 75, No. 1, Jul. 3, 1995, pp. 156-159.

* cited by examiner

*Primary Examiner*—Constantine Hannaher
(74) *Attorney, Agent, or Firm*—Oblon, Spivak, McClelland, Maier & Neustadt, L.L.P.

(57) ABSTRACT

A radiation detection device, including a detector in semiconductor material, a first electrode, and a second electrode. The first electrode has a form of pixels, with a first pitch, on one of the sides of the detector. The device further includes a mechanism for identifying the energy of an incident photon in the detector as a function of signals coming uniquely from the second electrode.

20 Claims, 2 Drawing Sheets

DEVICE AND METHOD FOR MEASURING THE ENERGY AND POSITION OF AN INCIDENT IONISING PARTICLE IN A DETECTOR

TECHNICAL FIELD AND PRIOR ART

The invention concerns the field of X-ray or gamma imaging, for semi-conductor based high spatial resolution.

In particular, it may be used for imaging small animals with a monolithic detector in CdZnTe.

The invention is also applicable to any semi-conductor based detector where one wishes to localise the position of interaction of a radiation in the detector. It is also suitable for localising protons, or alpha particles in said detectors.

A method of sorting, in real time, events in a detector is known: such a method is described in the document FR-2 790 560.

However, this technique is not satisfactory in the case of small pixels.

Indeed, for small pixels, millimetric or sub-millimetric, this method imposes high stresses on the detector material.

In order for the signal on each pixel to be representative of the photon detected, the material must be sufficiently homogeneous. However, the presence of defects in the material, such as for example twins or inclusions of tellurium in the case of CdZnTe, alters the quality of the signal. Moreover, with small pixels, the rise time of the signal becomes more difficult to measure as the size of the pixel decreases, which makes a biparametric type correction (amplitude, rise time) less efficient. This is the case in particular when the smallest dimension of each pixel becomes less than a quarter of the thickness of the detector.

The problem is to measure both the position of interaction of the photon (in x, y) and its energy.

To do this, one has a signal induced on the anodes and that induced on the cathode.

The techniques used presently to carry out high spatial resolution imaging use the signal from the anodes to measure the energy and the position (x, y).

Certain techniques use the ratio of the cathode signal to the anode signal, a ratio that only depends on the interaction depth to correct the measurement of the energy measured on the anode. This measurement needs to be corrected because the anode signal depends on the interaction depth.

However, all of these techniques are based on the correct measurement of the signal from the anode, which places high stresses on the detector material.

DESCRIPTION OF THE INVENTION

The invention concerns firstly a radiation detection device, comprising a detector in semi-conductor material, a first and a second electrode, characterised in that the first electrode has the form of pixels, with a first pitch, on one of the sides of the detector, and in that the device further comprises means for identifying the energy of an incident photon in the detector as a function of signals coming uniquely from the second electrode.

Such a detector, with first pixelized electrode, enables, according to the invention, the localisation of the interactions (in x, y) and the measurement of the energy to be separated.

Each pixel is for example inscribed in a square of side between 10 µm and 2 mm or less than half of the thickness of the detector.

The second electrode may be full, or segmented, or have the form of pixels, with a second pitch greater than the first pitch.

The detector is for example in CdZnTe or in CdHgTe or in CdTe.

Such a detector, with first pixelized electrode, enables, according to the invention, the localisation of the interactions (in x, y) and the measurement of the energy to be separated.

The localisation is carried out by the anodes and the energy is measured uniquely with the cathode (or the anode).

Since the cathode (or the anode) integrates the movement of the electrons in the whole volume of the detector, the stress on the homogeneity of the material is removed.

Means enable the position of an incident photon in the detector to be identified as a function of the signals from the pixels of the first electrode. The interaction position of a photon in the detector is therefore, for its part, identified uniquely by means of the first electrode.

The invention therefore further concerns a radiation detection method employing a device as described above, in which the energy of a photon in the detector is identified uniquely by means of signals from pixels from the second electrode.

If the signal induced in the detector is a signal of electrons, the first electrode is the anode.

If the signal induced in the detector is a signal of holes, the first electrode is the cathode.

Unlike existing systems that measure, at least partially, the energy with the anode signal (in the case of a signal of electrons), or with the cathode signal (in the case of a signal of holes), the invention proposes only using for this the cathode signal, respectively anode.

DETAILED DESCRIPTION OF EMBODIMENTS OF THE INVENTION

Figure 1A:
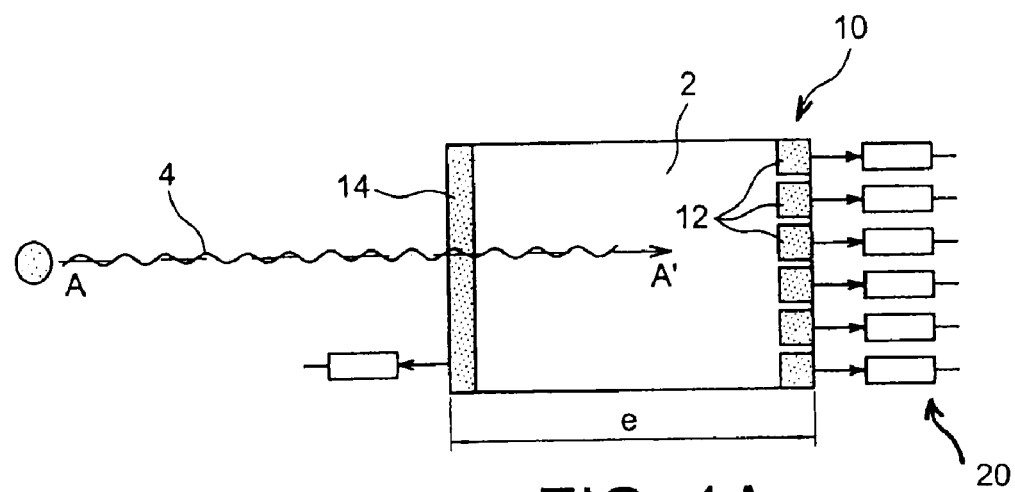
FIGS. 1A-1C show a detector according to the invention.
Figure 1B:
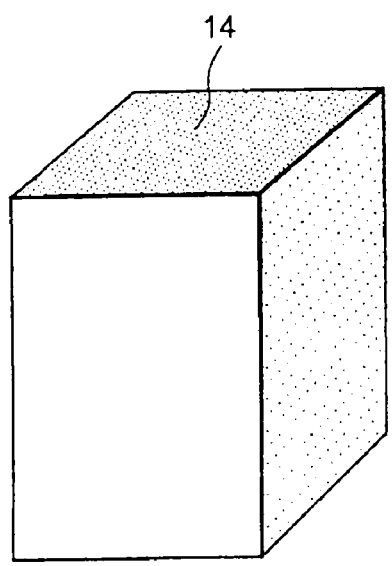
Figure 1C:
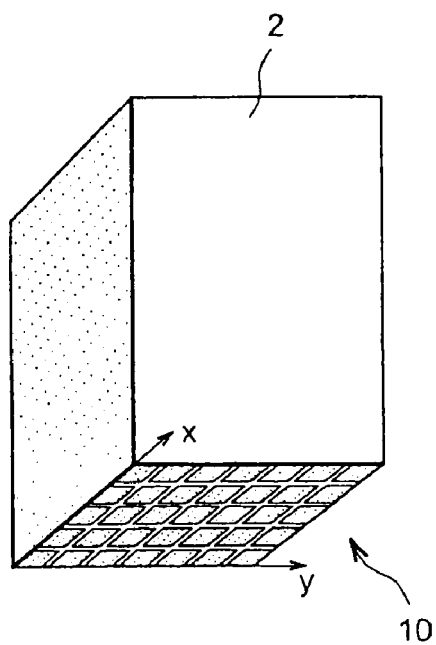

A first embodiment of the invention is illustrated in FIGS. 1A-1C.

It concerns a CdZnTe detector 2, in which a radiation 4, for example of gamma type, has interacted.

The anode 10 of the detector is constituted of pixels 12 spread out on one face of said detector. The pixels measure for example between 10 µm and 2 mm sideways, or are each included or inscribed in a square of side between 10 µm and 2 mm or, more generally in a square of side less than half of the thickness "e" of the detector (distance separating the cathode and anode faces of the detector). They are spread out according to a pitch for example between 20 µm and 2.5 mm.

If one considers two pixels of the same form, this pitch of the detector is the distance between the centre (or another point) of a pixel and the centre (or the same point) of the nearest pixel. In the case of pixels in strip form, one may use a median of the strip.

In particular, each pixel may have a smaller dimension less than a quarter of the thickness of the detector 2.

In the example illustrated in the figures, the cathode 14 is fully facing on the other face of the detector.

The pixels are localised at the anode and the cathode is fully facing because it involves working with a signal of electrons, particularly when the detector is in CdZnTe, in which the lifetime of the holes is very short.

However, it is possible to work with a hole signal (or a mixed signal), and in this case the cathode is pixelized and the anode is full.

In the case of the signal of electrons, one may work with a fully facing cathode, as indicated above, which gives the best results. However, the same technique may be employed with a cathode that only covers a part of the face, or even with a segmented cathode. Or instead, the cathode may itself also be pixelized, with a pitch greater than the anode.

One may use a detector in CdZnTe or in CdTe. However, other semi-conductors (CdHgTe or CdTe doped Cl or In or Al or CdZnTe doped Cl or In etc.) may be used. In a general manner, high resistivity ($10^8$-$10^{12}$·$\Omega cm^{-1}$) semi-conductors may be used.

The detectors used may be parallelepiped rectangles that measure between 3 mm and 100 mm sideways and between 1 mm and 30 mm high.

However, the invention may be employed with other dimensions.

The pixels are represented square in FIG. 1C, but other forms (triangles, hexagons, discs, strips, etc.) may be envisaged.

In operation, the detector is polarised by polarisation means.

A photon 4 (for example a gamma photon) arrives in the detector on the cathode 14 side.

It creates electron-hole pairs that migrate towards the anodes 10 under the effect of the applied field.

Each block 20 at the output of the detector block represents means constituting a measuring channel (with at least one preamplifier, and an amplifier followed by a suitable treatment (electronic card, ASIC, or digitization for example)).

On each pixel 12, one measures the charge deposited. Each pixel has its signal processing channel.

All of these measurements make it possible to go back to the position of interaction (x, y) of the photon 4 in the detector.

On the cathode (or on the segments or the pixels of the cathode if it involves a segmented cathode) are measured both the amplitude and the rise time of the signal, as described in the document FR-2 790 560, but on the anode.

This information enables the energy of the incident photon to be measured with a sufficient precision for the targeted applications.

One thereby obtains energy resolutions less than 15%.

According to the invention, each electrode is therefore dedicated to a measurement: the pixelized electrode, or that with the smallest pitch, is used for measuring the position, in the plane X, Y of the detector (FIG. 1C), or substantially perpendicular to the incidence axis AA' (FIG. 1A) of the photon, of the event that constitutes the interaction of said photon with the material of the detector.

The other electrode, which may be common to all of the pixels or itself also in the form of pixels, but with larger pitch, as explained above, enables the measurement of the energy.

These measurements are independent of each other, unlike the methods described in the prior art.

A method of treatment or biparametric correction as described in the document FR-2 790 560 may be employed to improve the energy resolution.

Figure 2:
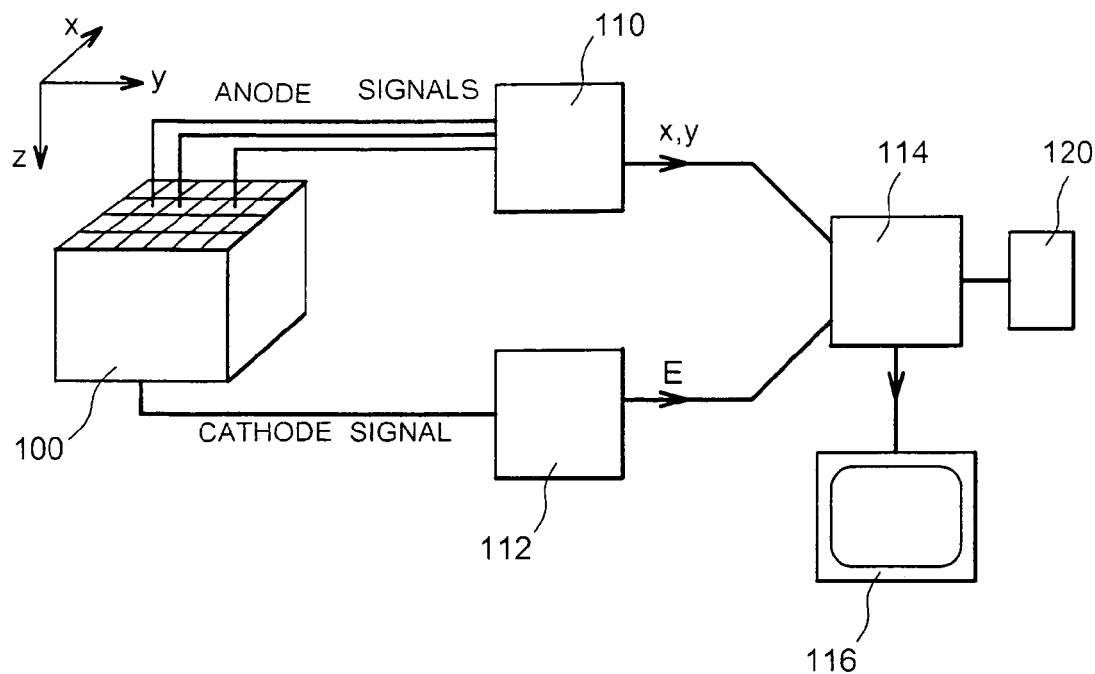
FIGS. 2 and 3 show a measuring device with detector according to the invention.

A method according to the invention may be employed by means of a device as illustrated in FIG. 2.

The reference 100 in FIG. 2 designates a matrix of semi-conductor detection elements 102, arranged in a detection plane.

Figure 3:
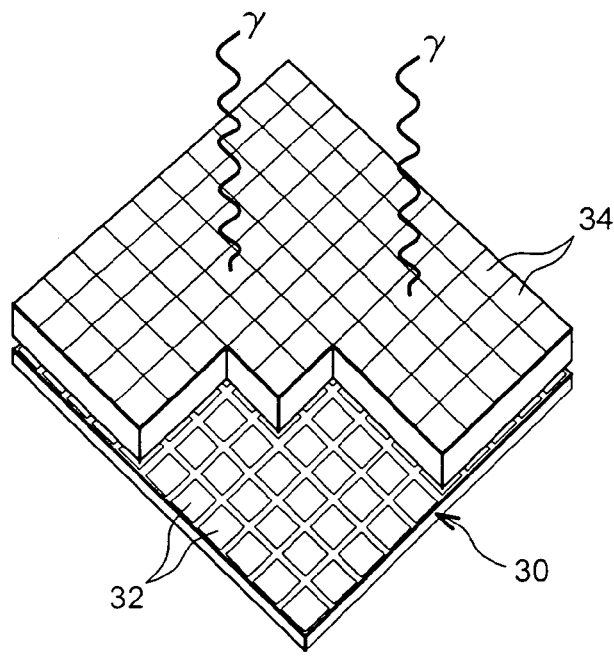

FIG. 3 shows the example of a structure of a semi-conductor detector. This comprises a platform 30 equipped with integrated electronic circuits 32 and on which is assembled a plurality of detection elements 34.

The detection elements 34 are each in the form of a semi-conductor block with two opposite parallel faces on which are provided electrodes. An electrical field applied to the electrodes makes it possible to migrate the charge bearers, in other words the electrons and the holes formed by the interaction of the radiation with the semi-conductor.

The electrodes of each detection element, not shown in the figure, but having the form indicated above according to the invention, are also provided to receive the charges and to transfer them towards the integrated circuits of the platform 30 for the formation of a detection signal.

The anode signals delivered by the detection elements are directed towards a first integrated circuit for example a specific integrated circuit (ASIC) 110. This circuit comprises signal amplification channels for each detection element and channel multiplexing means.

A second circuit 112 is provided to determine the amplitude and the rise time of each signal from the cathode and to format the data corresponding to these magnitudes, as well as the data representing the coordinates of the events.

The coordinates of the events are linked to the corresponding position of the detection element in the detection plane. A circuit such as the circuit 112 is for example described in document FR-2 738 919.

The data are directed towards a computer 114 intended to perform calculations and processing linked to the calibration phase and intended to construct an image (for example medical) from the data during the acquisition phase. The image is displayed on a screen 116.

The data for employing a processing method may be memorised in the computer 114 or in a memory indicated by the reference 120 in FIG. 2. During the acquisition phase, the circuits 110 and 112 establish data of the amplitude, rise time and coordinates of the events from the signals from the detection elements.

From the independent information of position (in x, y in the plane of the anode, see FIG. 2) and energy (cathode signal), the means 114 can calculate the position in the depth of the detector.

A spectrum may be obtained and displayed on the screen 116 during an acquisition. A device and a method according to the invention may be used within the scope of examinations practised on small animals.

The invention claimed is:

1. A radiation detection device, comprising:
   a detector in semi-conductor material;
   an anode and a cathode, the anode having a form of pixels, with a first pitch, on one of the sides of the detector; and
   means for measuring energy of an incident photon in the detector only with a signal received from the cathode and not with a signal from the anode.

2. The device according to claim 1, each pixel being inscribed in a square of side less than half the thickness of the detector.

3. The device according to claim 1, wherein the cathode is full.

4. The device according to claim 1, wherein the cathode is segmented.

5. The device according to claim 1, wherein the cathode has a form of pixels, with a second pitch greater than the first pitch.

6. The device according to claim 1, wherein the detector is in CdZnTe or in CdHgTe or in CdTe or in a high resistivity semi-conductor material.

7. The device according to claim 1, further comprising means for identifying a position of an incident photon in the detector as a function of signals coming uniquely from the anode.

8. A radiation detection method, comprising:
    detecting a photon in a detector in semi-conductor material, including an anode and a cathode, the anode having a form of pixels, with a first pitch, on one of the sides of the detector; and
    detecting energy of said incident photon with an energy detection circuit based on only on a signal received from the cathode and not with a signal from the anode.

9. A radiation detection device, comprising:
    a detector in semi-conductor material;
    an anode and a cathode, the cathode having a form of pixels, with a first pitch, on one of the sides of the detector; and
    means for measuring energy of an incident photon in the detector only with a signal received from the anode and not with a signal received from the cathode.

10. The device according to claim 9, each pixel being inscribed in a square of side less than half the thickness of the detector.

11. The device according to claim 9, wherein the anode is full.

12. The device according to claim 9, wherein the anode is segmented.

13. The device according to claim 9, wherein the anode has a form of pixels, with a second pitch greater than the first pitch.

14. The device according to claim 9, wherein the detector is in CdZnTe or in CdHgTe or in CdTe or in a high resistivity semi-conductor material.

15. The device according to claim 9, further comprising means for identifying a position of an incident photon in the detector as a function of signals coming uniquely from the cathode.

16. A radiation detection method, comprising:
    detecting a photon in a detector in semi-conductor material, including an anode and a cathode, the cathode having a form of pixels, with a first pitch, on one of the sides of the detector; and
    detecting energy of said incident photon with an energy detection circuit based on only on a signal received from the anode and not with a signal received from the cathode.

17. A radiation detection device, comprising:
    a detector in semi-conductor material;
    an anode and a cathode, the anode having a form of pixels, with a first pitch, on one of the sides of the detector; and
    an energy detection circuit configured to measure energy of an incident photon in the detector only with a signal received from the cathode and not with a signal from the anode.

18. The radiation detection device of claim 17, further comprising:
    a processing apparatus configured to identify a position of an incident photon in the detector as a function of signals coming uniquely from the anode.

19. A radiation detection device, comprising:
    a detector in semi-conductor material;
    an anode and a cathode, the cathode having a form of pixels, with a first pitch, on one of the sides of the detector; and
    an energy detection circuit configured to measure energy of an incident photon in the detector only with a signal received from the anode and not with a signal received from the cathode.

20. The radiation detection device of claim 19, further comprising:
    a processing apparatus configured to identify a position of an incident photon in the detector as a function of signals coming uniquely from the cathode.

* * * * *